US011501642B2

(12) United States Patent
Joyce et al.

(10) Patent No.: US 11,501,642 B2
(45) Date of Patent: Nov. 15, 2022

(54) METHOD AND SYSTEM OF DETECTING A WRONG-WAY DRIVING VEHICLE

(71) Applicant: GM Global Technology Operations LLC, Detroit, MI (US)

(72) Inventors: Mark J Joyce, Royal Oak, MI (US); Matt Neely, Rochester, MI (US); Russell A Patenaude, Macomb Township, MI (US); Curtis L Hay, Washington Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 196 days.

(21) Appl. No.: 17/084,151

(22) Filed: Oct. 29, 2020

(65) Prior Publication Data
US 2022/0139225 A1    May 5, 2022

(51) Int. Cl.
| | | |
|---|---|---|
| *H04M 11/04* | (2006.01) | |
| *G08G 1/16* | (2006.01) | |
| *H04W 4/48* | (2018.01) | |
| *H04W 4/02* | (2018.01) | |
| *G01S 13/931* | (2020.01) | |
| *G01S 17/931* | (2020.01) | |
| *G06V 20/58* | (2022.01) | |

(52) U.S. Cl.
CPC ............ *G08G 1/162* (2013.01); *G01S 13/931* (2013.01); *G01S 17/931* (2020.01); *G06V 20/58* (2022.01); *H04W 4/027* (2013.01); *H04W 4/48* (2018.02); *G01S 2013/93271* (2020.01); *G01S 2013/93272* (2020.01)

(58) Field of Classification Search
CPC .... G08G 1/162; G08G 1/0112; G08G 1/0133; G08G 1/0141; G08G 1/04; G08G 1/056; G08G 1/096716; G08G 1/09675; G08G 1/096775; G08G 1/096791; G01S 13/931; G01S 17/931; G01S 2013/93271; G01S 2013/93272; G01S 2013/9316; G06V 20/58; H04W 4/027; H04W 4/48
USPC ...................................................... 455/404.2
See application file for complete search history.

(56) References Cited

U.S. PATENT DOCUMENTS

| | | | | |
|---|---|---|---|---|
| 10,696,306 | B1* | 6/2020 | Benisch | B60W 40/09 |
| 2016/0003630 | A1* | 1/2016 | Higuchi | G08G 1/167 |
| | | | | 701/41 |
| 2017/0018178 | A1* | 1/2017 | Poechmueller | G08G 1/09623 |

(Continued)

*Primary Examiner* — Tanmay K Shah
(74) *Attorney, Agent, or Firm* — Vivacqua Crane, PLLC (57) ABSTRACT

A system of a motor vehicle for detecting a wrong-way driving vehicle and warning third parties includes multiple sensors that generate associated input signals indicative of characteristics of a target vehicle. The telematics module further includes a controller and a storage medium storing computer code for execution by the controller. The computer code is configured to compare the characteristics of the target vehicle to associated threshold values. The computer code is further configured to determine a confidence score indicative of the wrong-way driving vehicle, in response to the controller determining that the characteristics exceed the threshold values. The computer code is further configured to compare the confidence score to a threshold score and generate a notification signal, in response to the controller determining that the confidence score is above the threshold score. The telematics module that transmits the notification signal to the third parties.

17 Claims, 2 Drawing Sheets

(56) References Cited

U.S. PATENT DOCUMENTS

2019/0378363 A1* 12/2019 Becker .................... H04L 67/34
2020/0223452 A1* 7/2020 Toda ..................... B60W 30/09

* cited by examiner

METHOD AND SYSTEM OF DETECTING A WRONG-WAY DRIVING VEHICLE

INTRODUCTION

The present disclosure generally relates to driver assistance systems for motor vehicles, and more particularly relates to a method and system of detecting a wrong-way driving vehicle and warning other drivers of the same.

Wrong-way driving is a hazardous result of driver error particularly on high-speed roadways, such as limited access roadways including turnpikes or interstate expressways. Wrong-way driving may result in head-on collisions, and the approach rates of both vehicles on high-speed roadways can combine for an excessive rate of speed. For instance, two vehicles approaching one another at 65 miles per hour ("mph") can result in a 130 mph collision. The contributing causes for driver error can vary and include driver intoxication and confusion.

While some wrong-way drivers are stopped by law enforcement and issued a citation, other wrong-way drivers may not be intercepted by law enforcement and continue driving in the wrong direction. In those situations, roadway users may report the wrong-way driver to emergency response personnel, such as a 911 computer-aided dispatch (CAD) call center. However, some roadway users may not report the wrong-way driver.

Thus, while existing driver assistance systems achieve their intended purpose, there is a need for a method and system of detecting a wrong-way driving vehicle and warning other drivers of the same.

SUMMARY

According to several aspects of the present disclosure, a system of a motor vehicle is provided for detecting a wrong-way driving vehicle and warning a plurality of third parties. The system includes a plurality of sensors mounted to the motor vehicle, with the sensors generating an associated one of a plurality of input signals indicative of a plurality of characteristics of a target vehicle. The system further includes a telematics module having a controller electrically connected to the sensors. The telematics module further includes a storage medium electrically connected to the controller and storing computer code for execution by the controller. The computer code is configured to compare the characteristics of the target vehicle to associated threshold values, in response to the controller receiving the input signals from the sensors. The computer code is further configured to determine a confidence score indicative of the wrong-way driving vehicle, in response to the controller determining that the characteristics exceed the threshold values. The computer code is further configured to compare the confidence score to a threshold score. The computer code is further configured to generate a notification signal, in response to the controller determining that the confidence score is above the threshold score. The telematics module further includes a mobile communication unit electrically connected to the controller and transmitting the notification signal to the plurality of third parties.

In one aspect, the sensors include at least one of a wheel velocity sensor and a global positioning unit mounted to the motor vehicle. Each of the wheel velocity sensor and the global positioning unit generates a first velocity signal indicative of a velocity of the motor vehicle. The global positioning unit generates a location signal indicative of a location of the motor vehicle and an associated delta velocity threshold value. The controller is electrically connected to the wheel velocity sensor and the global positioning unit for receiving the first velocity signal and the location signal. The controller receives a second velocity signal indicative of a velocity of the target vehicle. The computer code is further configured to determine a delta velocity based on a difference between the velocity of the motor vehicle and the velocity of the target vehicle, in response to the controller receiving the first velocity signal and the second velocity signal. The computer code is further configured to compare the delta velocity to the delta velocity threshold value, in response to the controller receiving the location signal and the associated delta velocity threshold value. The controller increases the confidence score by a predetermined increment, in response to the controller determining that the delta velocity is above the delta velocity threshold value.

In another aspect, the sensors further include at least one of a radar sensor and a lidar sensor mounted to the motor vehicle for generating the second velocity signal indicative of the velocity of the target vehicle. The controller is electrically connected to the radar and the lidar for receiving the second velocity signal.

In another aspect, the mobile communication unit receives the second velocity signal from the target vehicle in a V2V communication.

In another aspect, the sensors further include a forward-facing radar mounted to the motor vehicle and generating a forward signal, in response to the forward-facing radar detecting that the target vehicle is disposed forward of the motor vehicle. The sensors further include a rearward-facing radar mounted to the motor vehicle and generating a rearward signal, in response to the rearward-facing radar detecting that the target vehicle is disposed rearward of the motor vehicle. The controller further increases the confidence score by the predetermined increment, in response to the controller receiving the forward signal and then subsequently receiving the rearward signal associated with the target vehicle.

In another aspect, the controller initiates a timer to determine a first duration in which the forward-facing radar detected the target vehicle positioned forward of the vehicle and a second duration in which the rearward-facing radar detected the target vehicle positioned rearward of the vehicle. The controller further increases the confidence score by the predetermined increment, in response to the controller determining that each of the first and second durations is shorter than a predetermined duration threshold value.

In another aspect, the sensors further include a forward-facing camera for capturing an image of the target vehicle disposed forward of the motor vehicle. The computer code is configured to determine whether the image of the target vehicle displays one of a front end vehicle structure and a rear vehicle structure. The controller increases the confidence score by the predetermined increment, in response to the controller determining that the image displays the front end structure of the target vehicle.

According to several aspects of the present disclosure, a system of a motor vehicle is provided for detecting a wrong-way driving vehicle and warning a plurality of third parties. The system includes a plurality of sensors for generating an associated one of input signals indicative of a plurality of characteristics of a target vehicle. The system further includes a telematics module having a mobile communication unit that receives an incoming notification signal from at least one of the third parties. The incoming notification signal is indicative of a wrong-way driving vehicle and an associated preliminary confidence score. The telematics module further includes a controller electrically connected to the sensors for receiving the input signals. The controller is electrically connected to the mobile communication unit for receiving the incoming notification signal. The telematics module further includes a storage medium electrically connected to the controller and storing computer code for execution by the controller. The computer code is configured to compare the characteristics of the target vehicle to associated threshold values, in response to the controller receiving the input signals from the sensors. The computer code is further configured to determine a confidence score indicative of the wrong-way driving vehicle, in response to the controller determining that the characteristics exceed the associated threshold values and the controller receiving the preliminary confidence score. The computer code is further configured to compare the confidence score to a threshold score. The computer code is further configured to generate an outgoing notification signal, in response to the controller determining that the confidence score is above the threshold score. The mobile communication unit transmits the outgoing notification signal and confidence score to the third parties.

In one aspect, the controller determines the confidence score by adding the predetermined increment to the preliminary confidence score.

In another aspect, the sensors include at least one of a wheel velocity sensor and a global positioning unit mounted to the motor vehicle. Each of the wheel velocity sensor and the global positioning unit generates a first velocity signal indicative of a velocity of the motor vehicle, and the global positioning unit further generates a location signal indicative of a location of the motor vehicle and an associated delta velocity threshold value. The controller is electrically connected to the wheel velocity sensor and the global positioning unit for receiving the first velocity signal and the location signal, and the controller receives a second velocity signal indicative of a velocity of the target vehicle. The computer code is further configured to determine a delta velocity based on a difference between the velocity of the motor vehicle and the velocity of the target vehicle, in response to the controller receiving the first velocity signal and the second velocity signal. The computer code is further configured to compare the delta velocity to the delta velocity threshold value, and the controller increases the confidence score by a predetermined increment, in response to the controller receiving the location signal and determining that the delta velocity is above the delta velocity threshold value.

In another aspect, the sensors further include at least one of a radar sensor and a lidar sensor mounted to the motor vehicle for generating the second velocity signal indicative of the velocity of the target vehicle. The controller is electrically connected to at least one of the radar and the lidar for receiving the second velocity signal.

In another aspect, the mobile communication unit receives the second velocity signal from the target vehicle in a V2V communication.

In another aspect, the sensors further include a forward-facing radar mounted to the motor vehicle and generating a forward signal, in response to the forward-facing radar detecting that the target vehicle is disposed forward of the motor vehicle. The sensors further include a rearward-facing radar mounted to the motor vehicle and generating a rearward signal, in response to the rearward-facing radar detecting that the target vehicle is disposed rearward of the motor vehicle. The controller further increases the confidence score by the predetermined increment, in response to the controller receiving the forward signal and then subsequently receiving the rearward signal associated with the target vehicle.

In another aspect, the controller initiates a timer to determine a first duration in which the forward-facing radar detected the target vehicle positioned forward of the vehicle and a second duration in which the rearward-facing radar detected the target vehicle positioned rearward of the vehicle. The controller further increases the confidence score by the predetermined increment, in response to the controller determining that each of the first and second durations is shorter than a predetermined duration threshold value.

According to several aspects of the present disclosure, a method of operating a system of a motor vehicle is provided for detecting a wrong-way driving vehicle and warning third parties. The system includes a plurality of sensors and a telematics module, with the telematics module including a controller, a storage medium with computer code, and a mobile communication unit. The method includes generating, using the sensors, input signals indicative of associated characteristics of a target vehicle. The method further includes comparing, using the controller, the characteristics of the target vehicle to associated threshold values, in response to the controller receiving the input signals from the sensors. The method further includes determining, using the controller, a confidence score indicative of the wrong-way driving vehicle, in response to the controller determining that the characteristics exceed the associated threshold values and the controller receiving the preliminary confidence score. The method further includes comparing, using the controller, the confidence score to a threshold score. The method further includes generating, using the controller, an outgoing notification signal, in response to the controller determining that the confidence score is above the threshold score. The method further includes transmitting, using the mobile communication unit, the outgoing notification signal and confidence score to the third parties.

In one aspect, the method further includes determining, using the controller, the confidence score by adding the predetermined increment to the preliminary confidence score.

In another aspect, the method further includes generating, using at least one of a wheel velocity sensor and a global positioning unit, a first velocity signal indicative of a velocity of the motor vehicle. The method further includes generating, using the global positioning unit, a location signal indicative of a location of the motor vehicle, and a delta velocity threshold value associated with the location. The method further includes receiving, with the controller, the first velocity signal, the location signal, and a second velocity signal indicative of a velocity of the target vehicle. The method further includes determining, using the controller, a delta velocity based on a difference between the velocity of the motor vehicle and the velocity of the target vehicle, in response to the controller receiving the first velocity signal and the second velocity signal. The method further includes comparing, using the controller, the delta velocity to the delta velocity threshold value, in response to the controller receiving the location signal. The method further includes increasing, using the controller, the confidence score by a predetermined increment, in response to the controller determining that the delta velocity is above the delta velocity threshold value.

In another aspect, the method further includes generating, using a forward-facing radar, a forward signal, in response to the forward-facing radar detecting that the target vehicle is disposed forward of the motor vehicle. The method further includes generating, using a rearward-facing radar, a rearward signal, in response to the rearward-facing radar detecting that the target vehicle is disposed rearward of the motor vehicle. The method further includes increasing, using the controller, the confidence score by the predetermined increment, in response to the controller receiving the forward signal and then subsequently receiving the rearward signal associated with the target vehicle.

In another aspect, the method further includes initiating, using the controller, a timer to determine a first duration in which the forward-facing radar detected the target vehicle positioned forward of the vehicle and a second duration in which the rearward-facing radar detected the target vehicle positioned rearward of the vehicle. The method further includes increasing, using the controller, the confidence score by the predetermined increment, in response to the controller determining that each of the first and second durations is shorter than a predetermined duration threshold value.

In another aspect, the method further includes capturing, using a forward-facing camera, an image of the target vehicle disposed forward of the motor vehicle. The method further includes determining, using the controller, whether the image of the target vehicle displays one of a front end vehicle structure and a rear vehicle structure. The method further includes increasing, using the controller, the confidence score by the predetermined increment in response to the controller determining that the image displays the front end structure of the target vehicle.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

An exemplary system of a motor vehicle includes a controller or processor (collectively hereinafter "controller") that executes computer code for the practical application of detecting a wrong-way driving vehicle and warning a plurality of third parties of same. To that end, techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions.

The current description relates to examples of methods and systems that employ steps and activities carried out by modules, including computers employing discrete rules and calculations, integrated into practical applications, such as the detection of wrong-way driving vehicles and warning third parties. In this example, the method and system uses one or more modules to determine a confidence score associated with the probability of a wrong-way driving vehicle to alert drivers of the wrong-way driver while reducing false-positive findings. The practical applications of the current disclosure include elements that implement or use computer and/or mental activities in conjunction with particular and integral machines and manufactured articles. The specific machines employed, and the beneficial results achieved, are tangible and physical. The disclosed activities have practical utility and solve technological challenges. More specifically, in this example, the method and system use multiple sensors to detect characteristics of a target vehicle, compares each characteristic to a threshold value associated with a wrong-way driving vehicle, and corroborates the findings so as to provide a robust analysis of target vehicles, reduce human error, and improve accuracy in detection.

The module may be implemented wholly, or partially, as a hardware circuit comprising discrete components. A module may also be implemented in programmable hardware devices, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may include disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

Figure 1:
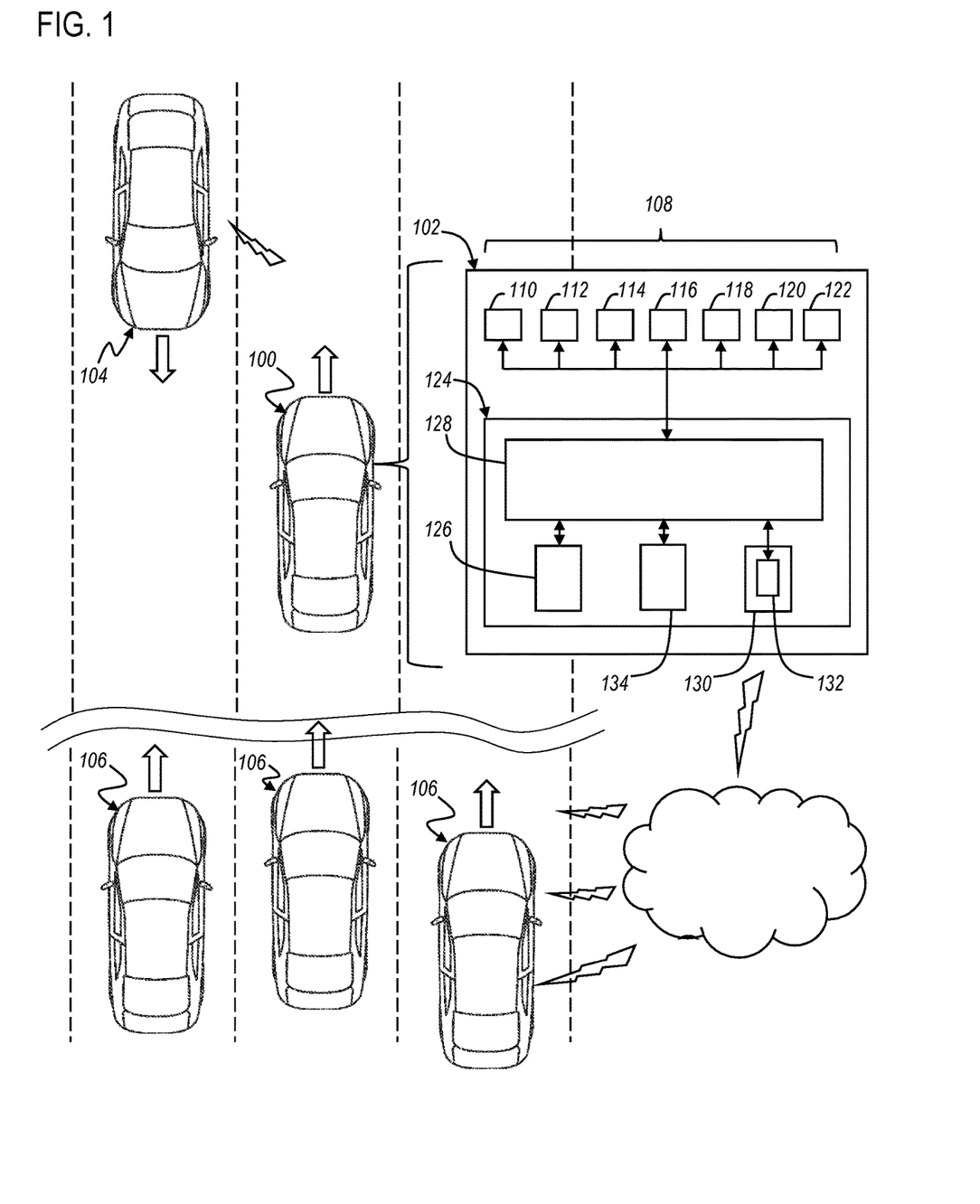
FIG. 1 is a schematic diagram of one example of a motor vehicle having a system for detecting a wrong-way driving vehicle and warning a plurality of third parties.

Referring to FIG. 1, there is illustrated one example of a motor vehicle 100 having a system 102 for detecting a vehicle 104 travelling in the wrong direction on roadways and warning a plurality of third parties. These third parties can include drivers of vehicles 106 that are located within a predetermined radius and have Vehicle-To-Vehicle (V2V) communication systems. In this example, the third parties can include drivers of vehicles trailing the motor vehicle 100 on the same roadway. In other examples, the third parties can include an emergency call center for first responders.

The system 102 includes a plurality of sensors 108 for generating an associated one of input signals indicative of a plurality of characteristics of a target vehicle 104. In this example, the sensors 108 include at least one of a wheel velocity sensor 110 and a global positioning unit 112 mounted to the motor vehicle 100, with each of the wheel velocity sensor 110 and the global positioning unit 112 generating a first velocity signal indicative of a velocity of the motor vehicle 100. In addition, the global positioning unit 112 further generates a location signal indicative of a location of the motor vehicle 100 and a delta velocity threshold value associated with the location. The delta velocity threshold value and the associated location can be stored in a lookup reference table of the global positioning unit 112. The delta velocity threshold value can indicate an empirically-determined maximum difference in velocity of two vehicles travelling in the same direction at the associated location. For instance, a delta velocity threshold value associated with an interstate expressway where the speed limit is 70 mph can be 90 mph. A motor vehicle travelling 60 mph in one direction on the interstate expressway and a wrong-way driving vehicle driving travelling 31 mph in the opposite direction would produce a delta velocity of 91 mph, which exceeds the delta velocity threshold value of 90 mph on the interstate expressway. In addition, two vehicles driving in the same direction at the same velocity would produce a delta velocity of 0 mph, which does not exceed the delta velocity threshold value. By way of another example, a delta velocity threshold value associated with a one-way street where the speed limit is 25 mph can be 40 mph. A motor vehicle travelling 25 mph in one direction on the one-way street and a target vehicle driving travelling 16 mph in the opposite direction would produce a delta velocity of 41 mph, which exceeds the delta velocity threshold value of 40 mph on the one-way street. It is contemplated that the system can have any suitable delta velocity threshold value associated with each location or independent of same.

The sensors 108 can further include at least one of a long-range radar sensor 114 and a long-range lidar sensor 116 mounted to the motor vehicle 100 for generating a second velocity signal indicative of the velocity of the target vehicle 104. Continuing with this example, the sensors 108 further include a forward-facing radar 118 mounted to the motor vehicle 100 and generating a forward signal, in response to the forward-facing radar 118 detecting that the target vehicle 104 is disposed forward of the motor vehicle 100. The sensors 108 further include a rearward-facing radar 120 mounted to the motor vehicle 100 and generating a rearward signal, in response to the rearward-facing radar 120 detecting that the target vehicle 104 is disposed rearward of the motor vehicle 100. Also, in this example, the sensors 108 further include a forward-facing camera 122 for capturing an image of the target vehicle 104 disposed forward of the motor vehicle 100.

The system 102 further includes a telematics module 124 having a mobile communication unit 126 configured to receive an incoming notification signal from at least one of the third parties. The incoming notification signal is indicative of a wrong-way driving vehicle, a preliminary confidence score, and a velocity of the wrong-way driving vehicle. In one example, the incoming notification signal can be received from a vehicle that previously encountered the wrong-way driving vehicle or an emergency call center.

The telematics module 124 further includes a controller 128 electrically connected to the sensors 108 for receiving the input signals and the mobile communication unit 126 for receiving the incoming notification signal. In this example, the controller 128 is electrically connected to at least one of the wheel velocity sensor 110 and the global positioning unit 112 for receiving the first velocity signal and the location signal. The controller 128 is further electrically connected to at least one of the radar sensor 114 and the lidar sensor 116 for receiving the second velocity signal. In another example, the controller 128 is electrically connected to the mobile communication unit 126 for receiving the second velocity signal from the target vehicle 104 or one or more third parties.

The telematics module 124 further includes a storage medium 130, which is a non-transitory computer readable medium electrically connected to the controller 128 for storing computer code 132 executed by the controller 128. The computer code 132 is configured to compare the characteristics of the target vehicle 104 to an associated one of a plurality of threshold values, in response to the controller 128 receiving the input signals from the sensors 108. The computer code 132 is further configured to determine a delta velocity based on a difference between the velocity of the motor vehicle and the velocity of the target vehicle, in response to the controller receiving the first velocity signal, the location signal, and the second velocity signal.

The computer code 132 is further configured to determine a confidence score indicative of the wrong-way driving vehicle, in response to the controller 128 determining that the characteristics exceed the threshold values. The controller 128 determines the confidence score by selectively adding a predetermined increment to the preliminary confidence score based on a comparison of the characteristics to the threshold values. For instance, the computer code 132 is further configured to compare the delta velocity to the delta velocity threshold value. The controller 128 increases the confidence score by adding the predetermined increment to the preliminary confidence score, in response to the controller 128 determining that the delta velocity is above the delta velocity threshold value. For instance, if the controller determines that the delta velocity of the motor vehicle 100 and the target vehicle 104 travelling on the interstate expressway is 101 mph, the controller 128 can determine that the delta velocity exceeds the delta velocity threshold value of 100 mph for the interstate expressway, and the controller 128 can increase the confidence score by adding the predetermined increment to the preliminary confidence score.

The controller 128 further increases the confidence score by the predetermined increment, in response to the controller 128 receiving the forward signal from the forward-facing radar 118 and then subsequently receiving the rearward signal from the rearward-facing radar 120.

The controller 128 further increases the confidence score by the predetermined increment, in response to the forward and rearward facing radars detecting movement of the target vehicle at a predetermined velocity from a location forward of the vehicle to a location rearward of the vehicle. In particular, the controller 128 initiates a timer to determine a first duration in which the forward-facing radar 118 detected the target vehicle positioned forward of the vehicle and a second duration in which the rearward-facing radar detected the target vehicle positioned rearward of the vehicle. The controller 128 increases the confidence score by the predetermined increment, in response to the controller 128 determining that each of the first and second durations is shorter than a predetermined duration threshold value associated with the location. For instance, the predetermined duration threshold value can be 5 seconds for an interstate expressway, and the controller can increase the confidence score by the predetermined increment, in response to the controller determining that the forward-facing radar first detected the target vehicle 104 in less than a 5-second duration and the rearward-facing radar subsequently detected the target vehicle 104 in less than a 5-second duration. It is contemplated that the predetermined duration threshold value can be more or less than 5 seconds and correspond with the roadway.

The computer code 132 is configured to determine whether the image of the target vehicle 104 displays one of a front end vehicle structure and a rear vehicle structure, and the controller 128 increases the confidence score by the predetermined increment, in response to the controller 128 determining that the image displays the front end structure of the target vehicle. The computer code 132 can include object classification data for determining whether the image is the front end vehicle structure or the rear end vehicle structure. It is contemplated that the system can compare other suitable characteristics of the target vehicle to associated threshold values for detecting a wrong-way driver.

The computer code 132 is configured to compare the confidence score to a threshold score and generate an outgoing notification signal, in response to the controller 128 determining that the confidence score is above the threshold score. The mobile communication unit 126 transmits the outgoing notification signal and confidence score to the third parties.

Figure 2:
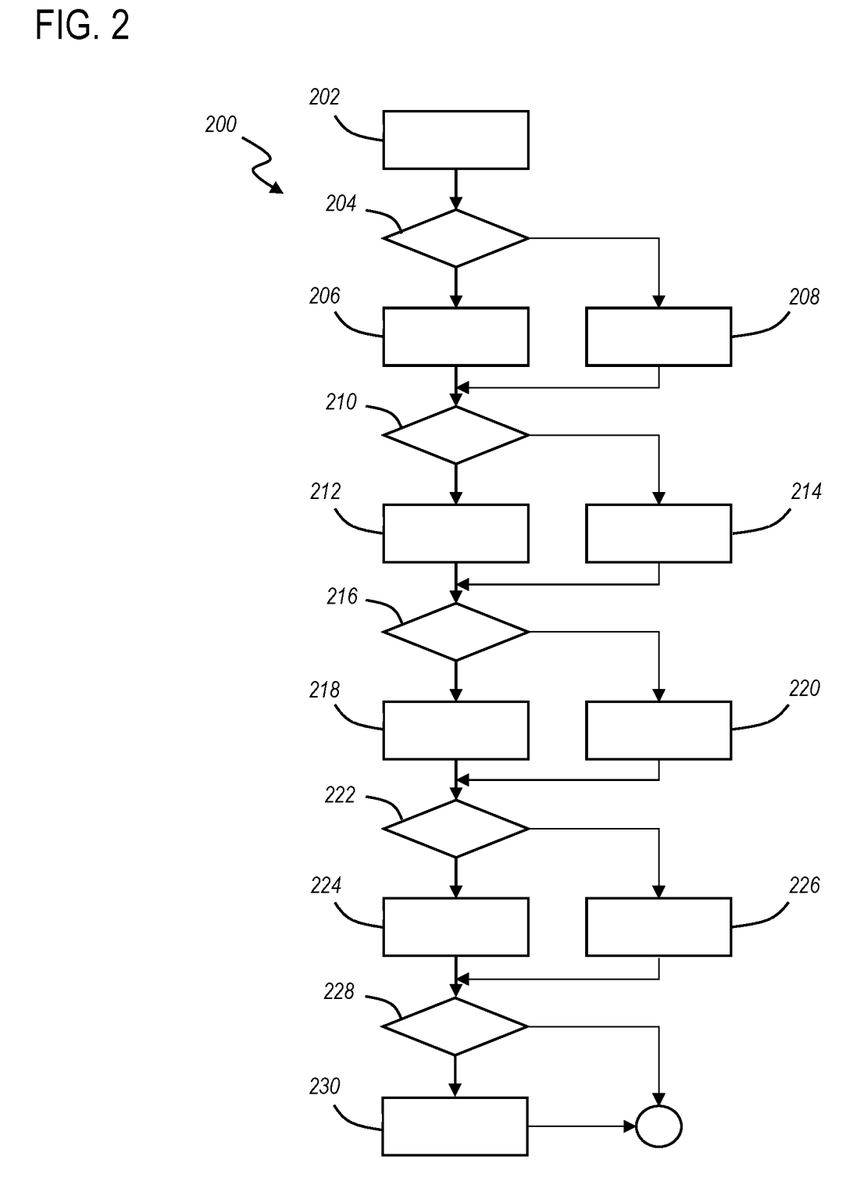
FIG. 2 is a flow chart of one example of a method of operating the system of FIG. 1.

Referring to FIG. 2, there is illustrated a flow chart of one example of a method 200 of operating the system 102 of FIG. 1. The method 200 commences at block 202 with the sensors 108 generating an associated one of the input signals indicative of the characteristics of the target vehicle 104. In particular, at least one of the wheel velocity sensor 110 and the global positioning unit 112 generates the first velocity signal indicative of the velocity of the motor vehicle 100. The global positioning unit 112 generates the location signal indicative of the location of the motor vehicle 100 and the delta velocity threshold value associated with the location. The forward-facing radar 118 generates the forward signal, in response to the forward-facing radar 118 detecting that the target vehicle 104 is disposed forward of the motor vehicle 100. The rearward-facing radar 120 generates the rearward signal, in response to the rearward-facing radar 120 detecting that the target vehicle 104 is disposed rearward of the motor vehicle 100. The forward-facing camera 122 captures an image of the target vehicle 104 disposed forward of the motor vehicle 100.

At block 204, the controller 128 determines the confidence score indicative of the wrong-way driving vehicle 104, in response to the controller 128 determining that the characteristics exceed the threshold values, and the controller receiving the preliminary confidence score. More specifically, the controller 128 can receive the preliminary confidence score from one or more third parties via the mobile communication unit 126. The controller 128 can determine the confidence score by adding the predetermined increment to the preliminary confidence score for every third party sending the incoming notification signal to the vehicle 100. Furthermore, as described in detail below, the controller 128 compares the characteristics of the target vehicle 104 to an associated one of threshold values to further determine the confidence score, in response to the controller 128 receiving the input signals from the sensors 108.

In this example, the controller 128 receives the first velocity signal, the location signal, the associated delta velocity threshold value, and the second velocity signal. The controller 128 determines the delta velocity based on the difference between the velocity of the motor vehicle and the velocity of the target vehicle, in response to the controller receiving the first velocity signal and the second velocity signal. The controller 128 compares the delta velocity to the delta velocity threshold value. If the controller 128 determines that the delta velocity is above the delta velocity threshold value, the method 200 proceeds to block 206. If the controller 128 determines that the delta velocity is below the delta velocity threshold value, the method 200 proceeds to block 208.

At block 206, the controller 128 increases the confidence score by the predetermined increment.

At block 208, the controller 128 decreases the confidence score by the predetermined increment.

At block 210, the controller 128 determines whether the forward-facing radar 118 generated the forward signal before the rearward-facing radar generated the rear signal. If the controller 128 determines that the controller received the forward signal and then subsequently received the rearward signal associated with the target vehicle, the method proceeds to block 212. If the controller 128 determines that the controller did not receive the forward signal and then subsequently receive the rearward signal associated with the target vehicle, the method proceeds to block 214.

At block 212, the controller 128 increases the confidence score by the predetermined increment At block 214, the controller 128 decreases the confidence score by the predetermined increment At block 216, the controller 128 initiates the timer to determine the first duration in which the forward-facing radar detects the target vehicle 104 positioned forward of the vehicle 100 and the second duration in which the rearward-facing radar 120 detects the target vehicle 104 positioned rearward of the vehicle 100. If the controller 128 determines that each of the first and second durations is shorter than the predetermined duration threshold value, the method proceeds to block 218. If the controller 128 determines that at least one of the first and second durations is not shorter than the predetermined duration threshold value, the method proceeds to block 220.

At block 218, the controller 128 increases the confidence score by the predetermined increment.

At block 220, the controller 128 decreases the confidence score by the predetermined increment.

At block 222, the controller 128 determines whether the image of the target vehicle a front end vehicle structure or a rear vehicle structure. If the controller 128 determines that the image displays the front end vehicle structure of the target vehicle 104, the method proceeds to block 224. If the controller 128 determines that the image does not display the front end vehicle structure of the target vehicle 104, the method proceeds to block 226.

At block 224, the controller 128 increases the confidence score by the predetermined increment.

At block 226, the controller 128 decreases the confidence score by the predetermined increment.

At block 228, the controller 128 compares the confidence score to a predetermined threshold score stored in the storage medium. If the confidence score is above the threshold score, the method 200 proceeds to block 230. If the confidence score is below the threshold score, the method terminates.

At block 230, the controller 128 generates an outgoing notification signal and transmits the outgoing notification signal with the confidence score to the third parties. The outgoing notification signal is received by the third parties, such as drivers of vehicles 106 trailing the motor vehicle 100, and warns them of the wrong-way driving vehicle 104. In this example, the system 102 can include a notification device 134 (FIG. 1), such as a display device or a speaker, for warning the drivers of the vehicle of the wrong-way driver.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A system of a motor vehicle for detecting a wrong-way driving vehicle and warning a plurality of third parties, the system comprising:
  a plurality of sensors mounted to the motor vehicle and generating an associated one of a plurality of input signals indicative of a plurality of characteristics of a target vehicle; and
  a telematics module comprising:
    a controller electrically connected to the sensors;
    a storage medium electrically connected to the controller and storing computer code for execution by the controller, with the computer code configured to:
      compare the plurality of characteristics of the target vehicle to an associated one of a plurality of threshold values, in response to the controller receiving the input signals from the sensors;
      determine a confidence score indicative of the wrong-way driving vehicle in response to the controller determining that the characteristics exceed the threshold values;
      compare the confidence score to a threshold score; and
      generate a notification signal in response to the controller determining that the confidence score is above the threshold score; and
    a mobile communication unit electrically connected to the controller and transmitting the notification signal to the plurality of third parties;
  wherein the plurality of sensors comprises at least one of a wheel velocity sensor and a global positioning unit mounted to the motor vehicle, with each of the wheel velocity sensor and the global positioning unit generating a first velocity signal indicative of a velocity of the motor vehicle, and the global positioning unit further generates a location signal indicative of a location of the motor vehicle and a delta velocity threshold value associated with the location;
  wherein the controller is electrically connected to at least one of the wheel velocity sensor and the global positioning unit for receiving the first velocity signal and the location signal, and the controller receives a second velocity signal indicative of a velocity of the target vehicle;
  wherein the computer code is further configured to determine a delta velocity based on a difference between the velocity of the motor vehicle and the velocity of the target vehicle, in response to the controller receiving the first velocity signal, the location signal, and the second velocity signal; and
  wherein the computer code is further configured to compare the delta velocity to the delta velocity threshold value, and the controller increases the confidence score by a predetermined increment in response to the controller determining that the delta velocity is above the delta velocity threshold value.

2. The system of claim 1 wherein the plurality of sensors further comprises:
  at least one of a radar sensor and a lidar sensor mounted to the motor vehicle for generating the second velocity signal indicative of the velocity of the target vehicle;
  wherein the controller is electrically connected to at least one of the radar and the lidar for receiving the second velocity signal.

3. The system of claim 1 wherein the mobile communication unit receives the second velocity signal from the target vehicle in a V2V communication.

4. The system of claim 1 wherein the plurality of sensors further comprises:
  a forward-facing radar mounted to the motor vehicle and generating a forward signal in response to the forward-facing radar detecting that the target vehicle is disposed forward of the motor vehicle; and
  a rearward-facing radar mounted to the motor vehicle and generating a rearward signal in response to the rearward-facing radar detecting that the target vehicle is disposed rearward of the motor vehicle;
  wherein the controller further increases the confidence score by the predetermined increment in response to the controller receiving the forward signal and then subsequently receiving the rearward signal associated with the target vehicle.

5. The system of claim 4 wherein the controller initiates a timer to determine a first duration in which the forward-facing radar detected the target vehicle positioned forward of the vehicle and a second duration in which the rearward-facing radar detected the target vehicle positioned rearward of the vehicle, wherein the controller further increases the confidence score by the predetermined increment in response to the controller determining that each of the first and second durations is shorter than a predetermined duration threshold value.

6. The system of claim 5 wherein the plurality of sensors further comprises a forward-facing camera for capturing an image of the target vehicle disposed forward of the motor vehicle, and the computer code is configured to determine whether the image of the target vehicle displays one of a front end vehicle structure and a rear vehicle structure, and the controller increases the confidence score by the predetermined increment in response to the controller determining that the image displays the front end structure of the target vehicle.

7. A system of a motor vehicle for detecting a wrong-way driving vehicle and warning a plurality of third parties, the system comprising:
  a plurality of sensors for generating an associated one of input signals indicative of a plurality of characteristics of a target vehicle; and
  a telematics module comprising:
    a mobile communication unit receiving an incoming notification signal from at least one of the third parties, with the incoming notification signal indicating a wrong-way driving vehicle and a preliminary confidence score;
    a controller electrically connected to the sensors for receiving the input signals and the mobile communication unit for receiving the incoming notification signal; and
    a storage medium electrically connected to the controller and storing computer code for execution by the controller, with the computer code configured to:
      compare the plurality of characteristics of the target vehicle to an associated one of a plurality of threshold values, in response to the controller receiving the input signals from the sensors;

determine a confidence score indicative of the wrong-way driving vehicle in response to the controller determining that the characteristics exceed the threshold values and the controller receiving the preliminary confidence score;
compare the confidence score to a threshold score; and
generate an outgoing notification signal in response to the controller determining that the confidence score is above the threshold score;
wherein the mobile communication unit transmits the outgoing notification signal and confidence score to the third parties; and
wherein the controller determines the confidence score by adding the predetermined increment to the preliminary confidence score.

8. The system of claim 7 wherein the plurality of sensors comprises:
at least one of a wheel velocity sensor and a global positioning unit mounted to the motor vehicle, with each of the wheel velocity sensor and the global positioning unit generating a first velocity signal indicative of a velocity of the motor vehicle, and the global positioning unit further generates a location signal indicative of a location of the motor vehicle and a delta velocity threshold value associated with the location;
wherein the controller is electrically connected to at least one of the wheel velocity sensor and the global positioning unit for receiving the first velocity signal and the location signal, and the controller receives a second velocity signal indicative of a velocity of the target vehicle;
wherein the computer code is further configured to determine a delta velocity based on a difference between the velocity of the motor vehicle and the velocity of the target vehicle, in response to the controller receiving the first velocity signal, the location signal, and the second velocity signal; and
wherein the computer code is further configured to compare the delta velocity to the delta velocity threshold value, and the controller increases the confidence score by a predetermined increment in response to the controller determining that the delta velocity is above the delta velocity threshold value.

9. The system of claim 8 wherein the plurality of sensors further comprises:
at least one of a radar sensor and a lidar sensor mounted to the motor vehicle for generating the second velocity signal indicative of the velocity of the target vehicle;
wherein the controller is electrically connected to at least one of the radar and the lidar for receiving the second velocity signal.

10. The system of claim 8 wherein the mobile communication unit receives the second velocity signal from the target vehicle in a V2V communication.

11. The system of claim 8 wherein the plurality of sensors further comprises:
a forward-facing radar mounted to the motor vehicle and generating a forward signal in response to the forward-facing radar detecting that the target vehicle is disposed forward of the motor vehicle; and
a rearward-facing radar mounted to the motor vehicle and generating a rearward signal in response to the rearward-facing radar detecting that the target vehicle is disposed rearward of the motor vehicle;
wherein the controller further increases the confidence score by the predetermined increment in response to the controller receiving the forward signal and then subsequently receiving the rearward signal associated with the target vehicle.

12. The system of claim 11 wherein the controller initiates a timer to determine a first duration in which the forward-facing radar detected the target vehicle positioned forward of the vehicle and a second duration in which the rearward-facing radar detected the target vehicle positioned rearward of the vehicle, wherein the controller further increases the confidence score by the predetermined increment in response to the controller determining that each of the first and second durations is shorter than a predetermined duration threshold value.

13. A method of operating a system of a motor vehicle to detect a wrong-way driving vehicle and warn a plurality of third parties, the system including a plurality of sensors and a telematics module, with the telematics module including a controller, a storage medium with computer code, and a mobile communication unit, the method comprising:
generating, using the sensors, an associated one of input signals indicative of a plurality of characteristics of a target vehicle;
comparing, using the controller, the plurality of characteristics of the target vehicle to an associated one of a plurality of threshold values, in response to the controller receiving the input signals from the sensors;
determining, using the controller, a confidence score indicative of the wrong-way driving vehicle in response to the controller determining that the characteristics exceed the threshold values and the controller receiving the preliminary confidence score;
comparing, using the controller, the confidence score to a threshold score;
generating, using the controller, an outgoing notification signal in response to the controller determining that the confidence score is above the threshold score;
transmitting, using the mobile communication unit, the outgoing notification signal and confidence score to the third parties; and
determining, using the controller, the confidence score by adding the predetermined increment to the preliminary confidence score.

14. The method of claim 13 further comprising:
generating, using at least one of a wheel velocity sensor and a global positioning unit, a first velocity signal indicative of a velocity of the motor vehicle;
generating, using the global positioning unit, a location signal indicative of a location of the motor vehicle and a delta velocity threshold value associated with the location;
receiving, with the controller, the first velocity signal, the location signal, and a second velocity signal indicative of a velocity of the target vehicle;
determining, using the controller, a delta velocity based on a difference between the velocity of the motor vehicle and the velocity of the target vehicle, in response to the controller receiving the first velocity signal, the location signal, and the second velocity signal;
comparing, using the controller, the delta velocity to the delta velocity threshold value; and
increasing, using the controller, the confidence score by a predetermined increment in response to the controller determining that the delta velocity is above the delta velocity threshold value.

15. The method of claim 14 further comprising:

generating, using a forward-facing radar mounted to the motor vehicle, a forward signal in response to the forward-facing radar detecting that the target vehicle is disposed forward of the motor vehicle;

generating, using a rearward-facing radar mounted to the motor vehicle, a rearward signal in response to the rearward-facing radar detecting that the target vehicle is disposed rearward of the motor vehicle; and increasing, using the controller, the confidence score by the predetermined increment in response to the controller receiving the forward signal and then subsequently receiving the rearward signal associated with the target vehicle.

16. The method of claim 15 further comprising:

initiating, using the controller, a timer to determine a first duration in which the forward-facing radar detected the target vehicle positioned forward of the vehicle and a second duration in which the rearward-facing radar detected the target vehicle positioned rearward of the vehicle; and increasing, using the controller, the confidence score by the predetermined increment in response to the controller determining that each of the first and second durations is shorter than a predetermined duration threshold value.

17. The system of claim 16 further comprising:

capturing, using a forward-facing camera, an image of the target vehicle disposed forward of the motor vehicle;

determining, using the controller, whether the image of the target vehicle displays one of a front end vehicle structure and a rear vehicle structure; and increasing, using the controller, the confidence score by the predetermined increment in response to the controller determining that the image displays the front end structure of the target vehicle.

* * * * *